(12) United States Patent
Su

(10) Patent No.: US 9,746,151 B1
(45) Date of Patent: Aug. 29, 2017

(54) LIGHT SOURCE ASSEMBLY, AND HEADLAMP AND VEHICLE HAVING THE SAME

(71) Applicant: HON HAI PRECISION INDUSTRY CO., LTD., New Taipei (TW)

(72) Inventor: Yung-Jen Su, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/211,130

(22) Filed: Jul. 15, 2016

(30) Foreign Application Priority Data

May 24, 2016 (TW) .............................. 105116077 A

(51) Int. Cl.
| | |
|---|---|
| *B60Q 1/04* | (2006.01) |
| *F21S 8/10* | (2006.01) |
| *B60Q 1/00* | (2006.01) |
| *B60Q 1/14* | (2006.01) |

(52) U.S. Cl.
CPC ........ *F21S 48/1731* (2013.01); *B60Q 1/0023* (2013.01); *B60Q 1/04* (2013.01); *B60Q 1/143* (2013.01); *B60Q 1/1423* (2013.01); *F21S 48/1145* (2013.01); *F21S 48/1323* (2013.01); *F21S 48/1747* (2013.01)

(58) Field of Classification Search
CPC ...... B60Q 1/0023; B60Q 1/04; B60Q 1/1423; B60Q 1/143; F21S 48/1145; F21S 48/1323; F21S 48/1747

USPC .... 315/77, 82; 362/460, 475, 507, 511, 514, 362/538

See application file for complete search history.

(56) References Cited

U.S. PATENT DOCUMENTS

| | | | | |
|---|---|---|---|---|
| 9,108,568 | B2* | 8/2015 | Takahira | ............... B60Q 1/0023 |
| 2002/0015308 | A1* | 2/2002 | Naganawa | ............... B60Q 1/12 |
| | | | | 362/464 |
| 2004/0184279 | A1* | 9/2004 | Molto | ...................... B60Q 1/10 |
| | | | | 362/507 |
| 2005/0099821 | A1* | 5/2005 | Potter | ...................... B60Q 1/48 |
| | | | | 362/548 |
| 2015/0091439 | A1* | 4/2015 | Wright | ................... B60Q 1/143 |
| | | | | 315/82 |
| 2015/0175053 | A1* | 6/2015 | Schwaiger | ............... B60Q 1/04 |
| | | | | 315/82 |

* cited by examiner

*Primary Examiner* — Tung X Le
(74) *Attorney, Agent, or Firm* — Steven Reiss

(57) ABSTRACT

A light source assembly with default safety function includes a laser source, an optical splitter, a fluorescent layer, an optical-electrical converter, and a voltage controller. The optical splitter has first solid portion, a second solid portion, and an optical transition. The fluorescent layer can absorb a laser and convert it into visible light. The optical-electrical converter receives a portion of the visible light and converts it into an electrical signal. The voltage controller applies a voltage to the optical splitter when no electrical signal converted from visible light is received. Refractive indexes of the first and second solid portions are equal when no voltage is applied to the optical splitter but refractive index of the first solid portion increases when voltage is applied to the optical splitter, thereby causing total reflection of the laser beam.

20 Claims, 2 Drawing Sheets

LIGHT SOURCE ASSEMBLY, AND HEADLAMP AND VEHICLE HAVING THE SAME

FIELD

The subject matter herein generally relates to a light source, a headlamp having a light source, and a vehicle having a headlamp.

BACKGROUND

Vehicles can employ headlamps which comprise laser sources for emitting laser beam. The laser beam emitted by the laser source is absorbed by a fluorescent layer positioned adjacent to the laser source. The fluorescent layer converts the laser beam into visible light for illumination purposes. However, in some cases (for example, fluorescing agents in the fluorescent layer deteriorate), the fluorescent layer cannot absorb the laser beam from the laser source. The laser beam may directly travel out of the headlamp which may be harmful.

BRIEF DESCRIPTION OF THE DRAWINGS

Implementations of the present technology will now be described, by way of example only, with reference to the attached figures.

DETAILED DESCRIPTION

Figure 1:
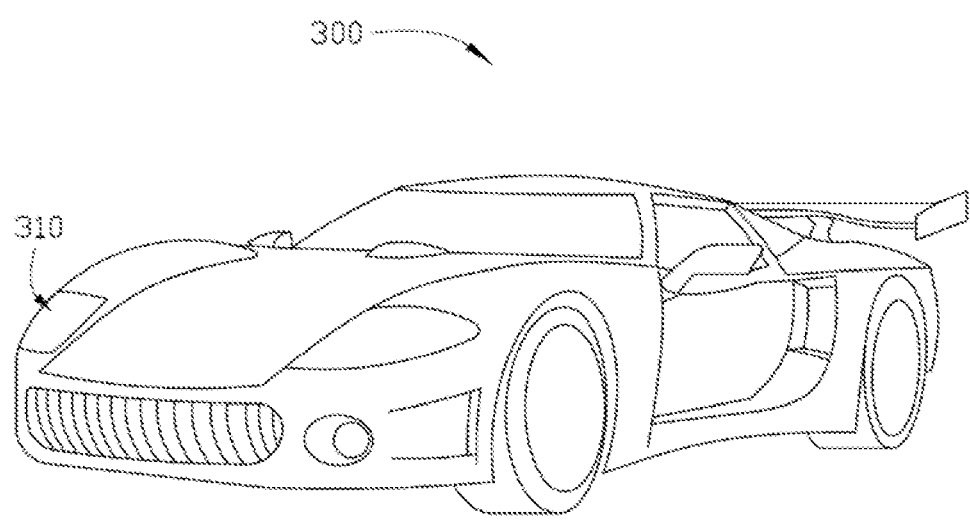
FIG. 1 is a diagrammatic view of an exemplary embodiment of a vehicle having a light source assembly of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
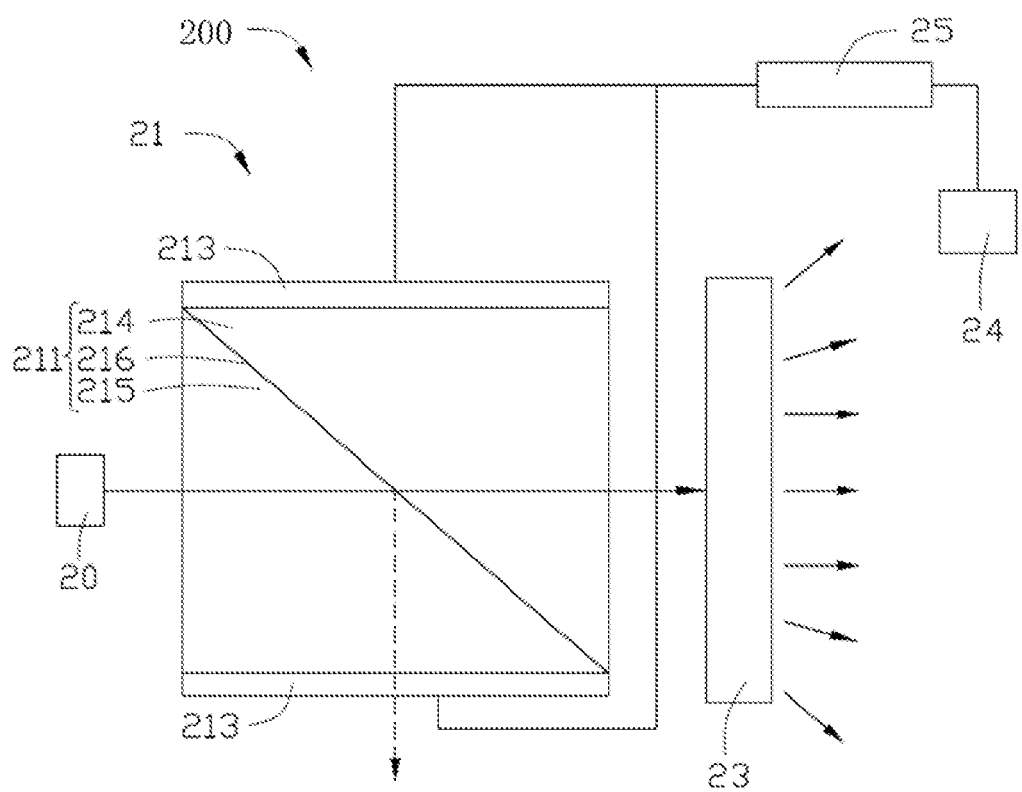
FIG. 2 is diagrammatic view of the light source assembly of FIG. 1.

FIGS. 1 and 2 illustrate an exemplary embodiment of a light source assembly 200 comprised in a headlamp 310 of a vehicle 300. The light source assembly 200 comprises a laser source 20, an optical splitter 21, a fluorescent layer 23, an optical-electrical converter 24, and a voltage controller 25.

The laser source 20 emits a laser beam.

The optical splitter 21 comprises a transparent substrate 211 and two electrical conductive films 213. The substrate 211 comprises a first solid portion 214 and a second solid portion 215 connected to the first solid portion 214, thereby forming an optical transition 216 between the first solid portion 214 and the second solid portion 215. The first solid portion 214 is positioned between the laser source 20 and the second solid portion 215.

An electrical conductive film 213 covers a portion of each of the first solid portion 214 and the second solid portion 215, and each electrical conductive film 213 is substantially parallel to an outgoing direction of the laser beam from the laser source 20. The laser beam from the laser source 20 can pass through the first solid portion 214, the optical transition 216, and the second solid portion 215 of the substrate 211 successively. In at least one exemplary embodiment, the electrical conductive films 213 are made of indium tin oxide (ITO) material.

In at least one exemplary embodiment, the first solid portion 214 is made of electro-optical material. Only the refractive index of the first solid portion 214 increases when the first solid portion 214 and the second solid portion 215 are located in an electric field. The electro-optical material can be selected from a group consisting of potassium dideuterium phosphate, ammonium dihydrogen phosphate, or any combination thereof.

In other exemplary embodiments, the first solid portion 214 and the second solid portion 215 are made of different electro-optical materials. The respective refractive indexes of the first solid portion 214 and the second solid portion 215 increase when the first solid portion 214 and the second solid portion 215 are located in the electric field, and an amount of the increase of the refractive index of the first solid portion 214 is greater than an amount of increase of the refractive index of the second solid portion 215.

The voltage controller 25 is electrically connected to the electrical conductive films 213, and can apply a voltage to the electrical conductive films 213.

When a voltage is not applied to the electrical conductive films 213, a refractive index of the first solid portion 214 is equal to a refractive index of the second solid portion 215. When the voltage controller 25 applies an electrical voltage to the electrical conductive films 213, the electric field is generated between the electrical conductive films 213, and the first solid portion 214 and the second solid portion 215 are located in the electric field. Because of the difference in materials making up the first solid portion 214 and the second solid portion 215, at least the refractive index of the first solid portion 214 increases when the first solid portion 214 and the second solid portion 215 are located in the electric field, thereby causing the refractive index of the first solid portion 214 to be greater than the refractive index of the second solid portion 215. The optical transition 216 is thus transformed into an optical splitting surface. The laser beam from the laser source 20 can be totally reflected by the optical splitting surface.

The fluorescent layer 23 can absorb the laser beam passing through the substrate 211, and convert the laser beam into visible light for illumination purposes.

The optical-electrical converter 24 is positioned adjacent to the fluorescent layer 23 to receive a portion of the visible light from the fluorescent layer 23. The optical-electrical converter 24 converts the visible light which it receives into an electrical signal. In at least one exemplary embodiment, the optical-electrical converter 24 is a photodiode.

In some cases (for example, fluorescing agents in the fluorescent layer 23 deteriorate), the fluorescent layer 23 does not convert the laser beam into visible light. Thus, the voltage controller 25 in this case receives no visible light from the fluorescent layer 23, and no electrical signal is generated.

When the voltage controller 25 receives no electrical signal from the optical-electrical converter 24, the voltage controller 25 applies voltage to the electrical conductive films 213, thereby causing at least the refractive index of the first solid portion 214 to increase and the optical transition 216 to be transformed into the optical splitting surface. Then, the laser beam from the laser source 20 can be totally reflected by the optical splitting surface, preventing the laser beam itself from directly traveling out of the light source assembly 200 in a potentially harmful manner.

It is to be understood, even though information and advantages of the present exemplary embodiments have been set forth in the foregoing description, together with details of the structures and functions of the present exemplary embodiments, the disclosure is illustrative only; changes may be made in detail, especially in matters of shape, size, and arrangement of parts within the principles of the present exemplary embodiments, to the full extent indicated by the plain meaning of the terms in which the appended claims are expressed.

What is claimed is:

1. A light source assembly comprising:
   a laser source configured to emit a laser beam;
   an optical splitter comprising a transparent substrate, the substrate comprising a first solid portion and a second solid portion connected to the first solid portion, thereby forming an optical transition therebetween, the first solid portion positioned between the laser source and the second solid portion;
   a fluorescent layer configured to absorb the laser beam passing through the substrate and convert the laser beam into visible light;
   an optical-electrical converter positioned adjacent to the fluorescent layer, able to receive a portion of the visible light from the fluorescent layer when the fluorescent layer generates the visible light, the optical-electrical converter configured to convert the received visible light into an electrical signal; and
   a voltage controller configured to apply a voltage to the optical splitter when the voltage controller receives no electrical signal from the optical-electrical converter;
   wherein a refractive index of the first solid portion is equal to a refractive index of the second solid portion when voltage controller applies no voltage to the optical splitter, at least the refractive index of the first solid portion increases when the voltage controller applies the voltage to the optical splitter, thereby causing the refractive index of the first solid portion to be greater than the refractive index of the second solid portion and the optical transition to be transformed into an optical splitting surface which is able to cause the laser beam from the laser source to be totally reflected.

2. The light source assembly of claim 1, wherein the optical splitter further comprises two electrical conductive films covering the first solid portion and the second solid portion, respectively, and substantially parallel to an outgoing direction of the laser beam from the laser source; the voltage controller is electrically connected to the electrical conductive films, and is configured to apply the voltage to the electrical conductive films; the electrical conductive films are configured to generate an electric field therebetween when the voltage controller applies an electrical voltage to the electrical conductive films, and the first solid portion and the second solid portion are located in the electric field which causes the at least the refractive index of the first solid portion to increase.

3. The light source assembly of claim 2, wherein the electrical conductive films are made of indium tin oxide material.

4. The light source assembly of claim 2, wherein the first solid portion is made of electro-optical material; only the refractive index of the first solid portion increases when the first solid portion and the second solid portion are located in the electric field.

5. The light source assembly of claim 4, wherein the electro-optical material is selected from a group consisting of potassium dideuterium phosphate and ammonium dihydrogen phosphate, or any combination thereof.

6. The light source assembly of claim 2, wherein the first solid portion and the second solid portion are made of different electro-optical materials; the refractive indexes of the first solid portion and the second solid portion increase when the first solid portion and the second solid portion are located in the electric field; and an amount of the increase of the refractive indexes of the first solid portion is greater than an amount of the increase of the refractive indexes of the second solid portion.

7. The light source assembly of claim 6, wherein the electro-optical material is selected from a group consisting of potassium dideuterium phosphate and ammonium dihydrogen phosphate, or any combination thereof.

8. The light source assembly of claim 1, wherein the optical-electrical converter is a photodiode.

9. A headlamp comprising:
   a light source assembly comprising:
      a laser source configured to emit a laser beam;
      an optical splitter comprising a transparent substrate, the substrate comprising a first solid portion and a second solid portion connected to the first solid portion, thereby forming an optical transition therebetween, the first solid portion positioned between the laser source and the second solid portion;
      a fluorescent layer configured to absorb the laser beam passing through the substrate and convert the laser beam into visible light;
      an optical-electrical converter positioned adjacent to the fluorescent layer, able to receive a portion of the visible light from the fluorescent layer when the fluorescent layer generates the visible light, the optical-electrical converter configured to convert the received visible light into an electrical signal; and
      a voltage controller configured to apply a voltage to the optical splitter when the voltage controller receives no electrical signal from the optical-electrical converter;
   wherein a refractive index of the first solid portion is equal to a refractive index of the second solid portion when voltage controller applies no voltage to the optical splitter, at least the refractive index of the first solid portion increases when the voltage controller applies voltage to the optical splitter, thereby causing the refractive index of the first solid portion to be greater than the refractive index of the second solid portion and the optical transition to be transformed into an optical splitting surface which is able to cause the laser beam from the laser source to be totally reflected.

10. The headlamp of claim 9, wherein the optical splitter further comprises two electrical conductive films covering the first solid portion and the second solid portion, respectively, and substantially parallel to an outgoing direction of the laser beam from the laser source; the voltage controller is electrically connected to the electrical conductive films, and is configured to apply the voltage to the electrical conductive films; the electrical conductive films are configured to generate an electric field therebetween when the voltage controller applies an electrical voltage to the electrical conductive films, and the first solid portion and the second solid portion are located in the electric field which causes the at least the refractive index of the first solid portion to increase.

11. The headlamp of claim 10, wherein the electrical conductive films are made of indium tin oxide material.

12. The headlamp of claim 10, wherein the first solid portion is made of electro-optical material; only the refractive index of the first solid portion increases when the first solid portion and the second solid portion are located in the electric field.

13. The headlamp of claim 12, wherein the electro-optical material is selected from a group consisting of potassium dideuterium phosphate and ammonium dihydrogen phosphate, or any combination thereof.

14. The headlamp of claim 10, wherein the first solid portion and the second solid portion are made of different electro-optical materials; the refractive indexes of the first solid portion and the second solid portion increase when the first solid portion and the second solid portion are located in the electric field; and an amount of the increase of the refractive indexes of the first solid portion is greater than an amount of the increase of the refractive indexes of the second solid portion.

15. The headlamp of claim 9, wherein the optical-electrical converter is a photodiode.

16. A vehicle comprising;
a headlamp comprising:
a light source assembly comprising:
a laser source configured to emit a laser beam;
an optical splitter comprising a transparent substrate, the substrate comprising a first solid portion and a second solid portion connected to the first solid portion, thereby forming an optical transition therebetween, the first solid portion positioned between the laser source and the second solid portion;
a fluorescent layer configured to absorb the laser beam passing through the substrate and convert the laser beam into visible light;
an optical-electrical converter positioned adjacent to the fluorescent layer, able to receive a portion of the visible light from the fluorescent layer when the fluorescent layer generates the visible light, the optical-electrical converter configured to convert the received visible light into an electrical signal; and
a voltage controller configured to apply a voltage to the optical splitter when the voltage controller receives no electrical signal from the optical-electrical converter;
wherein a refractive index of the first solid portion is equal to a refractive index of the second solid portion when voltage controller applies no voltage to the optical splitter, at least the refractive index of the first solid portion increases when the voltage controller applies voltage to the optical splitter, thereby causing the refractive index of the first solid portion to be greater than the refractive index of the second solid portion and the optical transition to be transformed into an optical splitting surface which is able to cause the laser beam from the laser source to be totally reflected.

17. The vehicle of claim 16, wherein the optical splitter further comprises two electrical conductive films covering the first solid portion and the second solid portion, respectively, and substantially parallel to an outgoing direction of the laser beam from the laser source; the voltage controller is electrically connected to the electrical conductive films, and is configured to apply the voltage to the electrical conductive films; the electrical conductive films are configured to generate an electric field therebetween when the voltage controller applies an electrical voltage to the electrical conductive films, and the first solid portion and the second solid portion are located in the electric field which causes the at least the refractive index of the first solid portion to increase.

18. The vehicle of claim 16, wherein the first solid portion is made of electro-optical material; only the refractive index of the first solid portion increases when the first solid portion and the second solid portion are located in the electric field.

19. The vehicle of claim 16, wherein the first solid portion and the second solid portion are made of different electro-optical materials; the refractive indexes of the first solid portion and the second solid portion increase when the first solid portion and the second solid portion are located in the electric field; and an amount of the increase of the refractive indexes of the first solid portion is greater than an amount of the increase of the refractive indexes of the second solid portion.

20. The vehicle of claim 16, wherein the optical-electrical converter is a photodiode.

* * * * *